United States Patent [19]

Theis

[11] Patent Number: 4,692,817

[45] Date of Patent: Sep. 8, 1987

[54] PROGRAMMED CONVERSATION RECORDING SYSTEM

[75] Inventor: Peter F. Theis, McHenry, Ill.

[73] Assignee: Morgan Industries, Inc., Gurnee, Ill.

[21] Appl. No.: 732,513

[22] Filed: May 9, 1985

Related U.S. Application Data

[63] Continuation of Ser. No. 334,243, Dec. 24, 1981, Pat. No. 4,539,436, which is a continuation-in-part of Ser. No. 856,105, Nov. 30, 1977, Pat. No. 4,328,396, which is a continuation-in-part of Ser. No. 605,240, Aug. 18, 1975, Pat. No. 4,506,393, which is a continuation-in-part of Ser. No. 439,445, Feb. 4, 1974, Pat. No. 4,496,601, and a continuation-in-part of Ser. No. 604,390, Aug. 15, 1975, Pat. No. 4,660,120.

[51] Int. Cl.⁴ .............................................. G11B 15/18
[52] U.S. Cl. ........................................ 360/12; 369/50; 379/80
[58] Field of Search ....................... 434/321, 320, 319; 369/50; 360/12; 179/6.04, 6.05, 6.06, 6.09, 6.14, 6.17, 6.03; 379/70, 71, 72, 73, 75, 80, 84

[56] References Cited

U.S. PATENT DOCUMENTS

| | | | |
|---|---|---|---|
| 3,426,339 | 2/1969 | Rich | 360/69 |
| 3,550,289 | 12/1970 | Orita | 369/50 |
| 3,594,505 | 7/1970 | Price | 434/319 |
| 3,641,507 | 2/1972 | Kasaka | 364/900 |
| 3,662,121 | 5/1972 | Cruger | 360/62 |
| 3,694,811 | 9/1972 | Wood | 360/12 |
| 3,708,891 | 1/1973 | Rosov | 434/321 |
| 3,721,774 | 3/1973 | Yomemoto | 360/55 |
| 3,747,228 | 7/1973 | Yamamoto | 360/12 |
| 3,810,316 | 5/1974 | Lahlow | 179/6.11 |
| 3,935,390 | 1/1976 | Winterhalter | 179/6.14 |

*Primary Examiner*—Alan Faber
*Attorney, Agent, or Firm*—Willian Brinks Olds Hofer Gilson & Lione Ltd.

[57] ABSTRACT

A programmed conversation recording system utilizes distinctive control signals to condition voice actuated circuitry to respond to silence intervals, pause intervals, and speech length intervals to select and start the appropriate prerecorded message for creating a facsimile of a live conversation with an unrehearsed and untrained respondent.

2 Claims, 2 Drawing Figures

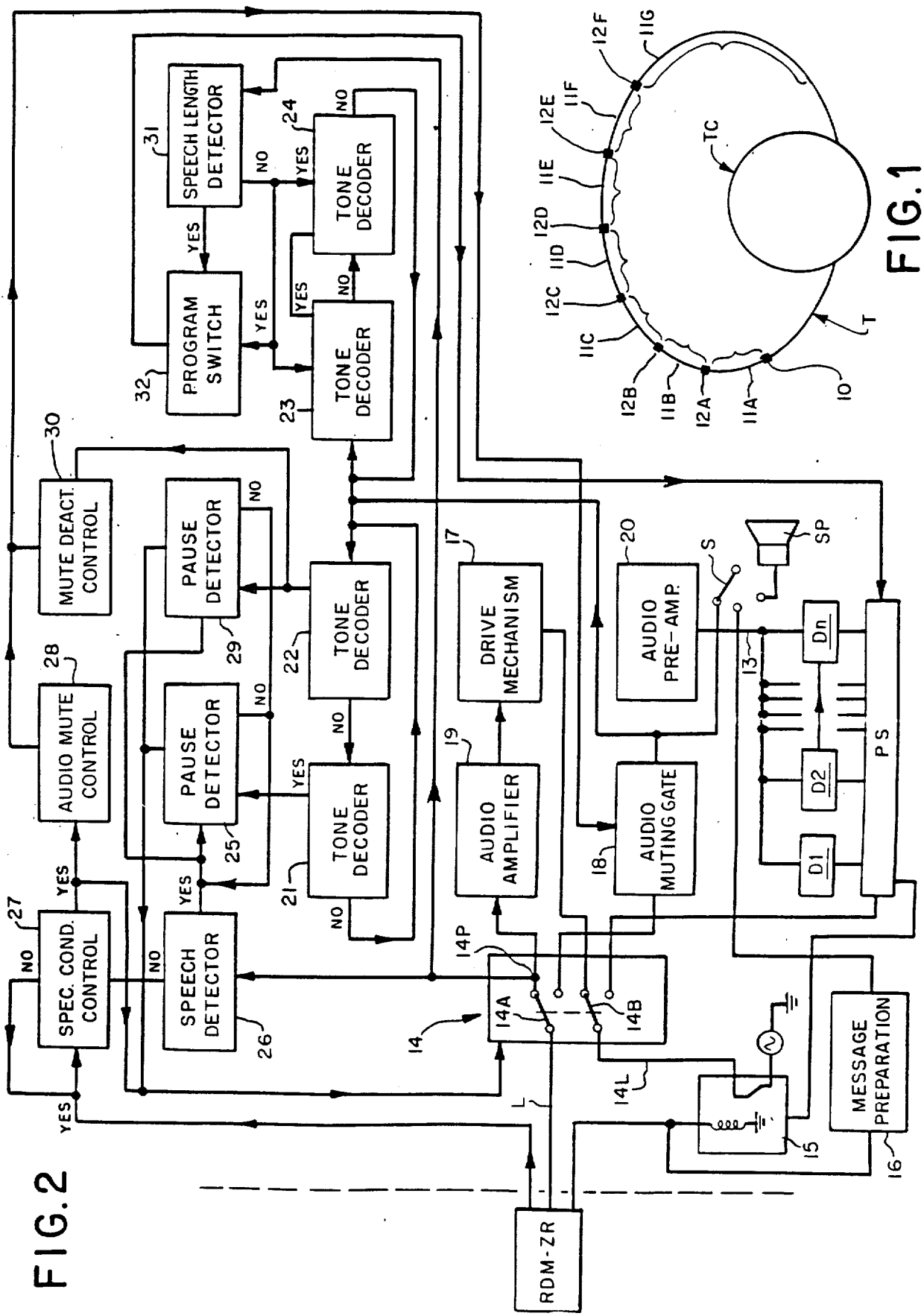

PROGRAMMED CONVERSATION RECORDING SYSTEM

RELATED APPLICATIONS

This application is a continuation of application Ser. No. 334,243, filed Dec. 24, 1981, now U.S. Pat. No. 4,539,436, which is is a continuation-in-part of pending U.S. application Ser. No. 856,105 filed on Nov. 30, 1977, now U.S. Pat. No. 4,328,396, which was a continuation-in-part of U.S. application Ser. No. 605,240 filed Aug. 18, 1975, now U.S. Pat. No. 4,506,393 which was a continuation-in-part of U.S. application Ser. No. 439,445 filed on Feb. 4, 1974, now U.S. Pat. No., 4,496,601, and Ser. No. 604,390 filed on Aug. 15, 1975, now U.S. Pat. No. 4,660,120.

SUMMARY OF THE INVENTION

The present invention provides a system wherein a selected set of control tones and pre-recorded message sections stored are played out in a sequence so that the control signals associated with each message section determine a response sequence that is particularly suited to the message. The system uses voice actuated equipment for responding to the silence, speech length and speech pauses of the user in accordance with the particular control signal that governs that section of the conversation.

More specifically, the invention provides a telephone answering system wherein successive message sections are placed on a tape or a combination of tapes, usually to ask the caller a series of questions, with a delay time between the questions operated by voice actuated circuitry. The delay time between questions is programmable by the cooperation of control signals and voice actuated circuitry and can be varied depending on the caller's anticipated reply pattern. The voice actuated circuitry has the capability of varying the pause length under program control.

The presently preferred embodiment provides a long delay prior to speech sensing and thereafter switches to pause sensing under program control. When an anticipated response does not occur, the preferred embodiment provides for advancing the program playout, with muting thereof, until a special condition control signal is sensed.

Another feature of the invention involves the use of a superimposed control signal in conjunction with a plurality of separate pre-recorded programs to provide for switching to a separate program or other control function upon the occurrence of a particular response characteristic.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a diagram showing an outgoing message recording having a continuous tape loop provided with a pre-recorded set of signals and announcements particularly suited to facilitate a programmed conversation with a caller; and FIG. 2 is a block diagram of a control circuit for connection to the recorder unit and to a telephone system to effect an automatic sequence of announcements to the caller and recording of the caller's responses.

DESCRIPTION OF PREFERRED EMBODIMENT

General Mode Of Operation

Referring now to the drawings, the general sequence of operation of the announcement function of the present system in the case of a typical automatically programmed conversation is summarized with reference to the pre-recorded continuous loop tape T which, as shown in FIG. 1, is associated with a tape cartridge TC for insertion into a tape deck.

The pre-recorded tape T is shown provided with a foil tab 10 followed by specific pre-recorded messages provided on tape regions 11 A to 11 F arranged to create a facsimile of a live conversation with the caller. The tape region 11 G contains a "special condition" message. Between the message sections, the tape is provided with pre-recorded control signals 12 A to 12 F, each being of a fixed frequency or of a fixed length or of some fixed parameter having a value in accordance with the control function required at that particular location in the sequence.

In the case of the continuous loop, the foil tab 10 serves to indicate both the beginning and end of the program, but the tape need not be continuous and recorded or otherwise stored signals may substitute for the tab's function.

In addition, the control signal may specify that if a particular response or speech interval is shorter than a specified interval, the system should switch to a separate and different pre-recorded tape or other function. In addition, any of the other control signals may be stored in memory banks rather than being on the same tape as the message segments.

Typical control functions determined by the values of the control signals are:

(a) a pause interval, namely the interval following the completion of a response; for example, a 6 KH$_z$ tone (hereafter referred to as frequency A) may denote a pause of two seconds and a 5 KH$_z$ tone (hereafter referred to as frequency B) may denote a pause of nine seconds;

(b) a superimposed signal, for example, an 8 KH$_z$ tone to indicate that if the response is of less than five seconds duration, the system will switch to a separate and different program tape.

The use of tones of these frequency values is because existing telephone equipment will not transmit them to the caller. This system does not require a tone signal following the message section to tell a caller when to respond.

Where "silence" is used herein, it has the usual meaning in this art, namely absence of speech.

The tone 12 A that follows the first message section 11 A signals the system that the first outgoing message region 11 A is completed and sequences the system to record an incoming response. If an incoming response is not received in a pre-set interval, typically ten seconds, the pre-recorded tape will advance without playing outgoing messages from sections 11 B to 11 F until it detects a special condition control signal 12 F.

If an incoming response is sensed within a predetermined interval, for example, ten seconds, the system will continue recording until a pause (a period of relative silence) of pre-determined length is sensed. The duration of the pause is controlled by the control signal 12 A. When that pause is sensed the pre-recorded tape T will play message segment 11 B and the incoming message recording is terminated.

The sequence continues until the foil tab 10 is reached or the following occurs: if control signal 12 A or a subsequent control signal includes a superimposed signal, the system will be conditioned, depending upon the particular response length, to switch to a separate program while advancing the original program to the foil tab 10.

It will thus be seen that the system employs a unique interaction between the content of the message sections, the time for a response to begin, the length of the response, and the pause following the response so that under automatic program control and voice actuated sequencing, a facsimile of a live conversation can be achieved, with the response being recorded for subsequent processing. In addition, the system provides the option to switch to a different program where the response indicates the need.

The system finds important application to a number of existing telephone operations, including, particularly:

(a) commercial order taking where a substantial amount of detailed information is required;

(b) market research questionnaires;

(c) various education, training and testing programs;

(d) computer data collection.

The system has a number of applications that do not utilize the telephone system, for example, any of items (b), (c) and (d) above.

Specific Description of a Telephone Answering Application

The circuit arrangement and connections for a typical system, as shown in FIG. 2, are arranged to connect to a telephone interface arrangement such as an RDM-ZR installed by the telephone company. The system, as shown herein, includes one or a number of programs decks D 1, D 2, etc. that are shown connected to a tape deck power sequencer PS. Each tape deck includes a head assembly for recording and playback from a tape T of the type shown in FIG. 1 and has its input/output connected to a common audio line 13.

The telephone interface RDM-ZR has an audio line L connected to an upper contact 14 A of a control means 14 that includes ganged switch contacts 14 A, 14 B shown in incoming message mode position. A cycle start unit 15 which maybe a conventional latching relay is connected either to be activated by a message preparation unit 16, such as a toggle switch on a microphone, that is used for initially recording a type T or to be activated by the ring-up circuit from the RDM-ZR. A three-position switch S is shown in the normal operating position. The switch S can also be set to receive output from the preparation unit 16 for initially preparing a pre-recorded message and signal program for each deck D 1, D 2 . . . D n. Finally, the switch S can be set to play back a program to a speaker SP.

When the control means 14 is in the incoming message mode as shown, it applies power over line 14 L and switch contact 14 B to a drive mechanism 17 for an incoming message tape deck. Correspondingly, the audio line L from the recorder coupler RDM-ZR is connected through switch contact 14 A to a junction point 14 P. The junction poit 14 P connects audio to a combined audio amplifier and tape deck system 19 that is powered by the drive mechanism 17 for recording the responses of the caller.

When the control means 14 is switched to the outgoing message mode, it applies power over line 14 L and switch contact 14 B to drive the tape deck power sequencer PS which applies power to the proper program tape deck D 1-D n. Correspondingly, the audio line L is connected through the audio muting gate 18, which may be a SPST relay or transistor switch, to the output of an audio pre-amplifier and amplifier system 20 which receives input from the proper program deck D 1-D n.

Boxes 17, 19, 25, 26, 27, 29 and 31 are inactive during the outgoing message mode.

The cycle start unit 15, upon being activated by an incoming call, causes power to be applied to D 1 and causes the RDM-ZR to seize the telephone line. The first message 11 A on deck D 1 is played through the audio pre-amplifier and amplifier system 20 and the then inactive audio muting gate 18 to the calling party.

When the first control signal 12 A is played through audio pre-amplifier and amplifier system 20, it is applied to decoding means, such as a conventional band pass filter, which includes a set of tone decoders 21, 22, 23, 24. If the tone has a frequency A, it will trigger tone decoder 21 and apply a trigger through its YES terminal to activate a logic circuit 25 that acts as a pause detector. The YES terminal of tone decoder 21 is also connected to cause the control switch 14 to disconnect the program deck D1 and apply power to the incoming message tape drive mechanism 17. Audio line L is switched to the audio amplifier 19 for recording the response. The incoming audio is also connected from junction 14 P to a speech detector 26 which may be a conventional voice actuation circuit, which is for sensing silence (absence of speech) intervals preceding an incoming message. It may be noted that "speech interval" as used herein and "pause interval" may be considered as a speech void.

The special condition control 27 is a conventional resettable electronic timer having an output after a pre-determined period. The output of special condition control 27 is reset by the RDM-ZR when the RDM-ZR returns the line to an on-hook condition. Considering the alternative wherein no speech is detected, typically within ten second (as pre-set in the special condition control 27), the special condition control 27 is activated thereby activating an audio muting control 28 which in conjunction with muting deactivation control 30 is a conventional set/reset flip-flop, thereby activating the audio muting gate 18.

Additionally, the special condition control 27 will cause the control switch 14 to revert to the outgoing message mode; however, because the audio muting gate 18 is active, no audio can be transmitted from amplifier 20 to the calling party. The program deck D 1 is re-energized and continues to play the prerecorded program until tone decoder 22 is activated.

When the deck D 1 plays a tone having the frequency B, it will trigger tone decoder 22 and apply a trigger to its YES terminal which energizes or rests the muting deactivation control 30, thereby deactivating the audio muting gate 18 to permit sound transmission to the caller, and which returns the system to normal operation in the outgoing message mode.

Considering the other alternative wherein the speech detector 26 does detect speech within ten seconds, that is, prior to the time when special condition control 27 would time out, its YES terminal triggers pause detector 25. If, subsequently, the YES terminal of speech detector 26 is off for two seconds, the pause detector 25 will cause the control switch 14 to revert to its outgoing message mode. This cycle will progress until the end of the tape is reached.

The system includes provisions for responding to the length of the live speech interval for selecting the subsequent message content. Each of tone decoders 23, 24 is responsive to a particular superimposed control signal to operate in conjunction with a speech length detector 31 for controlling a logic circuit serving as a program switch 32 that is connected to the power sequencer PS which could be a stepping switch circuit or a conventional electronic shift register circuit to act as a program switch control. The speech length detector 31 consists of a voice detection circuit and an electronic timer. The electronic timer will activate the program switch 32 causing the power sequencer PS to shift. When the YES terminal of one of decoders 23, 24 and the YES terminal of speech length detector 31 are activated, the program switch 32 will cause the power sequencer to switch from the previously active program deck to start a separate program deck.

If a tone A includes a superimposed tone A-1 that is recognized at any point, the previously described sequence will be the same except that tone decoder 23 will also be energized. If speech length detector 31 detects speech for a period typically less than five seconds, the program switch 32 will cause the power sequencer PS to activate the switch power to the next deck D 2 and cause deck D 1 to run until foil tab 10 is reached.

If speech length detector 31 receives speech for more than five seconds, its NO terminal causes reset of tone decoder 23.

If tone B includes a superimposed tone B-1 that activates tone decoder 24, a similar sequence occurs.

When all programs tape decks D 1 . . . D n that may have been started, have recycled to the foil tab 10, the system cycle is completed and the cycle start will be unlatched.

Typical Sequence Of Operations

1. An incoming call is detected by the telephone company interface RDM-ZR. This in turn signals the cycle control unit 15 and causes the system to start its cycle. Concurrently, the cycle control unit 15 causes the RDM-ZR to seize and complete the telephone line connection.
2. The control switch 14 is normally in the outgoing mode position. Program deck D 1 will being playing the first message 11 A, such as "May we help you?", through the audio preamplifier and amplifier 20 and the de-activated audio muting gate 18. Following this message on the program tape, and recorded on the tape at the same time as the program was recorded is a control tone 12 A. This control tone A is sensed by the tone decoder 21.
3. Tone decoder 21 causes the control switch 14 to switch to the incoming message position. When in this position, the program tape deck D 1 is inactive and the incoming tape drive mechanism 17 is powered and the audio amplifier 19 is active.
4. The caller will respond with an answer such as "I would like to place an order". This will be recorded on the tape deck system included in audio amplifier 19. This incoming message will also be sensed by the speech detector 26. When the incoming response stops, a continuous signal will be sent to the pause detector 25 which has previously been activated by the tone decoder 21. When a two second pause is detected in the speech by the pause detector 25, the control switch 14 will revert to the outgoing message position and program deck D 1 will start with the next message segment 11 B.
5. The next question might ask for the caller's name, repeating the sequence of steps 2 through 4. This sequence may be repeated several times as various questions are asked in message segments 11 C, 11 D, etc.
6. The question "What is your charge account number?" might typically be asked. In this case, as an example, the caller must go get his charge number so an immediate response may not be forthcoming. The speech detector 26 will not be activated until speech is sensed. This prevents the system from proceeding to the next question even though the lapse in speech is longer than two seconds prior to giving a response. Once the caller has responded, the speech detector is activated and the two second pause will be sought.
6A. If the caller did not respond at all within a reasonable period, typically ten seconds, the special condition control 27 is activated. This causes the audio muting control 28 to activate thereby energizing the audio muting gate 18. The control switch 14 is switched to the outgoing message position. Thus, the program tape D 1 will restart but the caller will not hear the program because the audio muting gate 18 will block audio to the caller.
6B. When the program reaches the position 12 F, a second tone B is sensed by the tone detector 11, the muting deactivation control 30 is energized, thereby de-activating the audio muting gate 18. Thus, the calling party will start hearing the outgoing message; for example, "Your call is being terminated. If your order is not complete, please call again and answer each question as it is asked." Additionally, the special condition control 27 will be activated causing the system to revert to normal operation. Normally, this feature is used to tell a calling party that has been inadvertently cut off to call back again. It can also be used to automatically sequence the system to an entirely different part of the program tape.
7. If the program proceeds normally as described in step 6, when the program reaches each tone position, each control tone is sensed by a tone detector to cause the control switch 14 to switch to the incoming message position. When in this position, the program tape deck D1 is inactive and incoming tape deck circuits of audio amplifier 19 and drive mechanism 17 are active.
8. During normal operation of the program, if the caller responds with an indefinite answer such as "Let me think now", followed by a longer pause before making a further response, this is recorded on incoming message tape units of audio amplifier 19 and drive mechanism 17. The incoming message is also sensed by the speech detector 26. When the speech stops, a signal is sent from the speech detector 26 to the pause detector 29 which has previously been activated by the tone detector. When a pause, typically set at from six to ten seconds, is sensed by the pause detector 29, the control switch 14 will revert to the outgoing message position and program deck D 1 will start with the next message segment 12 E.

9. If the control tone being sensed has a second signal superimposed theroen and is sensed by tone decoder 23, the system will also evaluate the duration of the speech period. Thus, for an outgoing message such as "If you need operator assistance, please ask for the operator; otherwise your order will be taken automatically if you will start by giving us your complete address", if the caller said "Operator", there would be less than five seconds of speech, and speech length detector 31 would cause the program switch 32 to cause the tape deck sequencer to shift to a second program deck D 2 to change the outgoing message to that appropriate for the short answer "Operator".

9A. If the caller answers by stating a complete address, there would be more than five seconds of speech so that the speech length detector 31 is not activated. This longer answer will not cause the program deck sequencer to change program decks but deck D 1 will continue with the in-line program.

10. When the foil tab 10 is sensed electrically, that tape deck is stopped. When all program decks have been stopped by the foil tab, the cycle is complete and the system is ready to accept the next incoming call.

The time intervals given herein are suited to a number of commercial order taking programs but are not intended to limit the scope of the invention. Each type of interval described herein may have either a greater time or lesser time depending upon the particular situation.

Summary

In the case of the preferred embodiment disclosed and described herein; the mode control means consist of the control switch 14; the means for storing a program is shown at D1–Dn; the means for playing the program is shown at 18, 20; the means for initiating operation of the means for playing is shown at 15; the decoding means is shown at 21, 22; the means for recording inomming messages is shown at 17, 19; and the speech detecting means is shown at 26. Interval detecting means, that is, means for detecting speech void are shown at 25 or 29.

In the disclosed embodiment, intended particularly for telephone applications, detection of silence intervals is important for initiating a sequence leading to automatic cut-off. This is important for insuring return of the equipment to a condition for receiving another call in the event the first call does not proceed to normal completion.

In non-telephone applications or in continuously monitored telephone answering applications, it is sometimes practical to eliminate the separate silence interval detection function. For example, the system may utilize a single detector of speech voids wherein the boxes 26, 27 are set to detect any speech void of pre-determined length occurring at any time during the incoming message mode. Such a simplified system is characterized by playing the control signal, that effects switching from outgoing to incoming message mode, substantially immediately following playing of the outgoing message section, thereby creating the environment of live conversation.

It is also contemplated that a silence interval detection, as described, can be provided where the program merely advances to the next message section to continue the sequence rather than to advance to the special condition fuction.

Thus, while preferred constructional features of the invention are embodied in the structure illustrated herein, it is to be understood that changes and variations may be made by those skilled in the art without departing from the spirit and scope of the appended claims.

What is claimed is:

1. An apparatus for carrying on a programmed conversation with a respondent, comprising:
   a message storage unit operative to store a sequence of audio messages for playback to the respondent;
   a response recorder unit operative to record responses of the respondent after individual ones of the audio messages;
   a pause detector coupled to the message storage unit to initiate playback of a next one of the audio messages automatically following a pause exceeding a selected duration in a response of the respondent;
   an alternate message storage unit operative to store an alternate audio message for playback to the respondent; and
   means for activating the alternate message storage unit to cause playback of the alternate audio message only in the event the respondent responds to a designated one of the audio messages and the respondent's response to said designated one of the audio messages has a duration within a selected time interval.

2. The invention of claim 1 wherein the selected time interval is less than a specified maximum time.

* * * * *

UNITED STATES PATENT AND TRADEMARK OFFICE
CERTIFICATE OF CORRECTION

PATENT NO. : 4,692,817
DATED : September 8, 1987
INVENTOR(S) : Peter F. Theis

Page 1 of 4

It is certified that error appears in the above-identified patent and that said Letters Patent is hereby corrected as shown below:

ON THE TITLE PAGE, IN THE SECTION ENTITLED "RELATED U.S. APPLICATION DATA" [63]

Please change the continuation data to read as follows:

Continuation of Ser. No. 334,243, Dec. 24, 1981, Pat. No. 4,539,436, which is a continuation-in-part of Ser. No. 856,105, Nov. 30, 1977, Pat. No. 4,328,396, which is a continuation-in-part of Ser. No. 605,240, Aug. 18, 1975, which is a continuation-in-part of Ser. No. 604,390, Aug. 15, 1975, and a continuation-in-part of Ser. No. 439,445, Feb. 4, 1974.

IN THE "RELATED APPLICATIONS"

In column 1, lines 7 through 17, please delete the entire paragraph which refers to the continuation data and substitute therefor:

UNITED STATES PATENT AND TRADEMARK OFFICE
CERTIFICATE OF CORRECTION

PATENT NO. : 4,692,817

DATED : September 8, 1987

INVENTOR(S) : Peter F. Theis

It is certified that error appears in the above-identified patent and that said Letters Patent is hereby corrected as shown below:

This application is a continuation of application Ser. No. 334,243, filed Dec. 24, 1981, now U.S. Pat. No. 4,539,436, which is a continuation-in-part of pending U.S. application Ser. No. 856,105 filed on Nov. 30, 1977, now U.S. Pat. No. 4,328,396, which was a continuation-in-part of U.S. application Ser. No. 605,240 filed Aug. 18, 1975, which was a continuation-in-part of U.S. application Ser. No. 604,390 filed on Aug. 15, 1975, which was a continuation-in-part of Ser. No. 439,445 filed on Feb. 4, 1974.

IN THE DESCRIPTION OF PREFERRED EMBODIMENT
Under the Subheading "Specific Description of a Telephone Answering Application"

In column 3, line 43, please delete the word "programs" and substitute therefor --program--;

In column 3, line 53, please delete "maybe" and substitute therefor --may be--;

In column 3, line 56, please delete "type T" and substitute therefor --tape T--;

UNITED STATES PATENT AND TRADEMARK OFFICE
CERTIFICATE OF CORRECTION

PATENT NO. : 4,692,817
DATED : September 8, 1987
INVENTOR(S) : Peter F. Theis

It is certified that error appears in the above-identified patent and that said Letters Patent is hereby corrected as shown below:

In column 4, line 2, please delete "poit" and substitute therefor --point--;

In column 4, line 49, please delete "second" and substitute therefor --seconds--;

In column 4, line 60, please delete "prerecorded" and substitute therefor --pre-recorded--;

In column 5, line 43, please delete "programs" and substitute therefor --program--.

IN THE DESCRIPTION OF PREFERRED EMBODIMENT
Under the Subheading "Typical Sequence of Operations"

In column 5, line 56 (Sequence No. 2), please delete "being" and substitute therefor --begin--;

In column 7, line 6 (Sequence No. 9), please delete "theroen" and substitute therefor --thereon--.

UNITED STATES PATENT AND TRADEMARK OFFICE
CERTIFICATE OF CORRECTION

PATENT NO. : 4,692,817

DATED : September 8, 1987

INVENTOR(S) : Peter F. Theis

It is certified that error appears in the above-identified patent and that said Letters Patent is hereby corrected as shown below:

IN THE DESCRIPTION OF PREFERRED EMBODIMENT
Under the Subheading "Summary"

In Column 7, lines 41-42, please delete "inoming" and substitute therefor --incoming--;

In Column 8, line 20, please delete "fuction" and substitute therefor --function--.

Signed and Sealed this

Fifth Day of July, 1988

Attest:

DONALD J. QUIGG

*Attesting Officer*  *Commissioner of Patents and Trademarks*